US008692936B2

(12) United States Patent
Polumbus et al.

(10) Patent No.: US 8,692,936 B2
(45) Date of Patent: *Apr. 8, 2014

(54) CAPTIONING EVALUATION SYSTEM

(71) Applicant: Caption Colorado LLC, Greenwood Village, CO (US)

(72) Inventors: Richard T. Polumbus, Englewood, CO (US); Troy Greenwood, Centennial, CO (US)

(73) Assignee: Caption Colorado, LLC, Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/732,019

(22) Filed: Dec. 31, 2012

(65) Prior Publication Data

US 2013/0242114 A1  Sep. 19, 2013

Related U.S. Application Data

(63) Continuation of application No. 12/104,216, filed on Apr. 16, 2008, now Pat. No. 8,345,159.

(60) Provisional application No. 60/912,165, filed on Apr. 16, 2007.

(51) Int. Cl.
*H04N 7/00* (2011.01)

(52) U.S. Cl.
USPC .......................... 348/468; 704/270

(58) Field of Classification Search
USPC ......... 348/468, 465, 564, 569, 589, 600, 180, 348/184; 704/270, 251; 345/551, 636
IPC ................ H04N 7/00,11/00, 5/445, 5/50, 9/74, H04N 9/76, 17/00, 17/02
See application file for complete search history.

(56) References Cited

U.S. PATENT DOCUMENTS

| | | | | |
|---|---|---|---|---|
| 5,508,754 | A * | 4/1996 | Orphan | 348/461 |
| 5,805,153 | A * | 9/1998 | Nielsen | 348/468 |
| 7,050,109 | B2 * | 5/2006 | Safadi et al. | 348/468 |
| 8,345,159 | B2 | 1/2013 | Polumbus et al. | |
| 2002/0075403 | A1 * | 6/2002 | Barone et al. | 348/461 |
| 2002/0196370 | A1 * | 12/2002 | Dagtas et al. | 348/600 |
| 2003/0169366 | A1 * | 9/2003 | Lenzi et al. | 348/461 |
| 2008/0270134 | A1 * | 10/2008 | Miyamoto et al. | 704/251 |

OTHER PUBLICATIONS

Cheetah International, "turboCAT", http://www.caption.com/English/Products/TurboCT/TurboCAT.html., printed Dec. 19, 2001, pp. 1-13.*

FCC Title 47 CFR 15.119, Chapter I—Federal Communications Commission, "Closed Caption Decoder Requirements", pp. 1-16, revised Oct. 1, 2000.*

* cited by examiner

*Primary Examiner* — Sherrie Hsia
(74) *Attorney, Agent, or Firm* — Dorsey & Whitney LLP

(57) ABSTRACT

A captioning evaluation system. The system accepts captioning data and determines a number of errors in the captioning data, as well as the number of words per minute across the entirety of an event corresponding to the captioning data and time intervals of the event. The errors may be used to determine the accuracy of the captioning and the words per minute, both for the entire event and the time intervals, used to determine a cadence and/or rhythm for the captioning. The accuracy and cadence may be used to score the captioning data and captioner.

20 Claims, 5 Drawing Sheets

CAPTIONING QUALITY EVALUATION

EVENT INFORMATION — 305

EVENT ID : 638469
EVENT DATE : 2/10/2007 5:30:00 AM

CADENCE SUMMARY — 310

| | |
|---|---|
| TOTAL MINUTES | 39.87 |
| TOTAL MINUTES OF COMMERCIALS | 20.00 |
| TOTAL MINUTES OF CAPTIONING | 19.87 |
| AVERAGE WPM COMPLETE FILE | 151.11 |

SUMMARY WPM WITHIN 15-SECOND INTERVALS
HIGH 228
LOW 60
MEDIAN 144

| DISTRIBUTION | NUMBER OF INTERVALS | % OF TOTAL INTERVALS |
|---|---|---|
| 30-100 WPM | 6 | 7.59% |
| 101-120 WPM | 9 | 11.39% |
| 121-130 WPM | 7 | 8.86% |
| 131-140 WPM | 9 | 11.39% |
| 150-160 WPM | 23 | 29.11% |
| 161-170 WPM | 4 | 5.06% |
| 171-180 WPM | 5 | 6.33% |
| 181-190 WPM | 4 | 5.06% |
| 191-200 WPM | 8 | 10.13% |
| 201 OR MORE WPM | 4 | 5.06% |
| TOTAL INTERVALS | 79 | 99.98% |

ACCURACY READABILITY RATING (ARR) — 300

| | |
|---|---|
| MISSPELLINGS, WRONG WORDS, WRONG NUMBERS | 19 |
| TRANSPOSED WORDS (TWO OR MORE TRANSPOSED WORDS) | 1 |
| PUNCTUATION - MISSING OR WRONG USE OF PERIOD OR QUESTION MARK (1/2 ERR.) | 1 (0.5) |
| INCORRECT OR MISSING SPEAKER ID OR STORY ID (>> >> REPORTER, >>>) | 0 |
| INCORRECT CURRENCY SYMBOL OF WORD (INCORRECT SYMBOL ERRORS ONLY) | 0 |
| INCOMPLETE SENTENCES | 0 |
| MISSING WORDS | 0 |
| INAUDIBLE, INDISCERNIBLE, AUDIO DIFFICULTIES (0 ERRORS, TRACKING PURPOSES ONLY) | 0 |
| WORD SPACING ERRORS (0 ERRORS, TRACKING PURPOSES ONLY) | 2 |

| | |
|---|---|
| TOTAL WORDS | 3001 — 325 |
| TOTAL ACCURACY READABILITY ERRORS (TARE) | 20.5 — 320 |
| ACCURACY READABILITY RATING (ARR) [(TWT - TARE)/TWT] | 99.32% — 315 |

FIG.3A

CAPTIONING QUALITY EVALUATION:
ACCURACY READABILITY RATING (ARR)

| EVENT ID | EVENT DATE | ARR ANALYST |
|---|---|---|
| 638469 | 2/10/2007 5:30:00 AM | |

| | |
|---|---|
| MISSPELLINGS, WRONG WORDS, WRONG NUMBERS | 19 |
| TRANSPOSED WORDS (TWO OR MORE TRANSPOSED WORDS) | 1 |
| PUNCTUATION - MISSING OR WRONG USE OF PERIOD OR QUESTION MARK (1/2 ERROR) | 1 (0.5) |
| INCORRECT OR MISSING SPEAKER ID OR STORY ID [>>, >> REPORTER, >>>] | 0 |
| INCORRECT CURRENCY SYMBOL OR WORD (INCORRECT SYMBOL ERRORS ONLY) | 0 |
| INCOMPLETE SENTENCES | 0 |
| MISSING WORDS | 0 |
| INAUDIBLE, INDISCERNIBLE, AUDIO DIFFICULTIES (0 ERRORS, TRACKING PURPOSES ONLY) | 0 |
| WORD SPACING ERRORS (0 ERRORS, TRACKING PURPOSES ONLY) | 2 |
| TOTAL WORDS | 3001 |
| TOTAL ACCURACY READABILITY ERRORS (TARE) | 20.5 |
| ACCURACY READABILITY RATING (ARR) [(TWT - TARE)/TWT] | 99.32% |

GUIDELINES AND INSTRUCTIONS

I. GENERAL WEIGHTING
ALL ERRORS EXCEPT PUNCTUATION COUNT AS 1 ERROR. PUNCTUATION ERRORS COUNT AS 1/2 ERROR. WORD SPACING ERRORS, AND INAUDIBLE ERRORS ARE COUNTED FOR TRACKING PURPOSES ONLY; NO ERRORS IS COUNTED IN SCORE.

II. MISSPELLINGS, WRONG WORDS, WRONG NUMBERS
  A. PROPER NOUNS (NAMES / PLACES) NOT WIDELY OR GENERALLY FAMILIAR            NO DEDUCTIONS
  B. WORDS / NUMBERS SPOKEN IN LANGUAGE OTHER THAN MAIN LANGUAGE OF PROGRAM      NO DEDUCTIONS

III. WORD SPACING ERRORS                                                             NO DEDUCTIONS
WORD SPACING ERRORS ARE TWO CORRECT AND ADJOINING WORDS WITH NO SPACE BETWEEN THE WORDS.

IV. INCORRECT CURRENCY SYMBOL OR WORD                            1 ERROR PER OCCURRENCE
DO NOT TRACK MONETARY VALUES MISSING THE CURRENCY SYMBOL. TRACK ONLY ATTEMPTS TO PLACE A CURRENCY SYMBOL WHEN THE WRONG SYMBOL IS TRANSCRIBED. E.G. #400.00, SHOULD BE $400.00

V. PUNCTUATION
  A. PERIODS AND QUESTION MARKS                                          1/2 ERROR
  B. OTHER PUNCTUATION                                                    NO DEDUCTIONS
  C. PUNCTUATION NOT COUNTED IN TWT EXCEPT ADD 1 WORD TO TWT FOR EACH 1/2 ERROR

VI. ERRORS PROPERLY CORRECTED BY CAPTIONER                                NO ERROR
(UNCORRECTED WORDS SHOULD NOT BE COUNTED IN TWT)

VII. INCOMPLETE SENTENCES                                               1 ERROR PER OCCURRENCE

VIII. INAUDIBLE, INDISCERNIBLE, AUDIO DIFFICULTIES                               NO ERROR
(SHOULD NOT BE COUNTED IN TARE, FOR TRACKING PURPOSES ONLY)

FIG.4

CAPTIONING EVALUATION SYSTEM

CROSS-REFERENCE TO RELATED APPLICATIONS

This application is a continuation of U.S. patent application Ser. No. 12/104,216, filed Apr. 12, 2008 and entitled "CAPTIONING EVALUATION SYSTEM," which is hereby incorporated by reference herein in its entirety and which in turn claims priority to U.S. provisional application Ser. No. 60/912,165, filed on Apr. 16, 2007 and entitled "Captioning Evaluation System" which is hereby incorporated herein in its entirety.

TECHNICAL FIELD

The present invention relates generally to closed captioning, and more particularly to evaluating accuracy and cadence of a closed caption or series of captions.

BACKGROUND OF THE INVENTION

Many events, such as television broadcasts, movies, live performances, courtroom activities, and so on, are transcribed or captioned. These captions may be added to the event as it is ongoing or during a replay of the event. The captions may also be used later separately to review the event. captions are often useful, for example, when persons who are hearing-impaired watch or participate in the event. They may also be used when the event is watched at a low or zero volume or to clarify audio in the event.

Although captions are useful, their usefulness is impaired when the captions are irregular or inaccurate. Irregular captioning speed may cause some captions to appear and disappear too quickly to be read or remain too long, thus losing a viewer's or participant's interest. Likewise, inaccurate captions may confuse a viewer or participant, or in extreme cases reverse or negate the meaning of the event being captioned.

Generally, reviewing captions for accuracy and flow ("cadence" or "rhythm") has been haphazard at best. Accordingly, what is needed is an improved captioning evaluation system.

SUMMARY OF THE INVENTION

One embodiment of the present invention takes the form of a captioning scoring and/or evaluation system. The embodiment may be, for example, software operating on a computing device or appropriately-configured computing hardware, or a combination of both. The embodiment may accept captioning either directly from the person or entity creating captions or from a database, server, computing device, or computer-readable medium.

The embodiment may perform one or more operations on the captioning data to evaluate and/or score the corresponding captions and, by extent, the captioner. For example, the embodiment may determine an overall number of grammatical and/or spelling errors, as well as a number of grammar and/or spelling errors within a given time frame or number of words. In addition to determining grammatical and/or spelling errors in captions, the embodiment may compute a words-per-minute ("WPM") score for captioning data. The embodiment may likewise determine a captioning cadence or rhythm.

Additional advantages and features of the various embodiments described herein will become apparent to those of ordinary skill in the art upon reading this document in its entirety.

BRIEF DESCRIPTION OF THE FIGURES

FIG. 3A shows a first portion of a sample scoring report generated by a reporting tool, including an accuracy readability rating and cadence summary for a captioned event.

FIG. 4 shows a second scoring report generated by a reporting tool.

DETAILED DESCRIPTION OF THE INVENTION

Introduction

Figure 1:
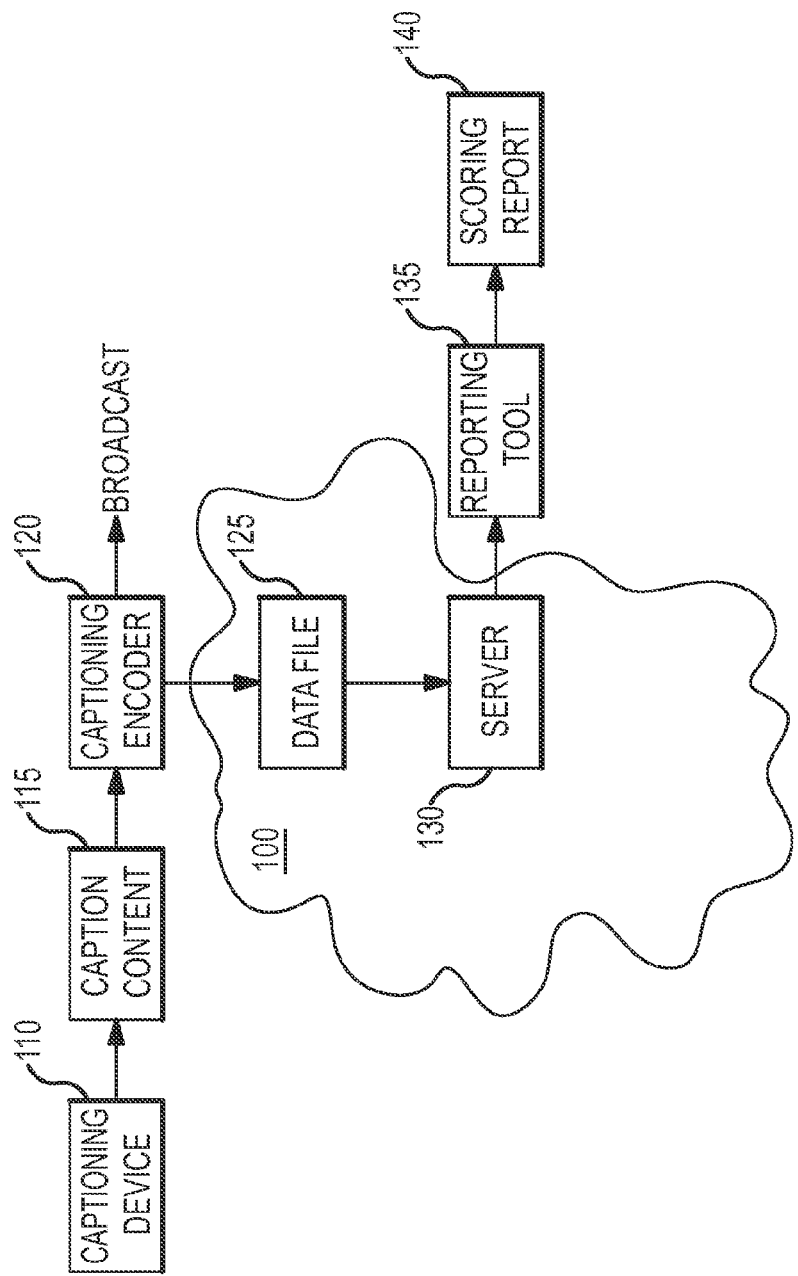
FIG. 1 displays an exemplary embodiment in an exemplary operating environment.

One embodiment of the present invention takes the form of a captioning scoring and/or evaluation system. The embodiment may be, for example, software operating on a computing device or appropriately-configured computing hardware, or a combination of both. The embodiment may accept captioning data (or an input containing captioning data) either directly from the person or entity creating captions ("captioner") or from a database, server, computing device, or computer-readable medium. For example, the captioning data may be stored as part of a computer readable file and transmitted across a network to the embodiment from a server, captioner or captioning device. Alternatively, the embodiment may be fully or partially integrated into a captioning device, permitting scoring and/or evaluation as media is captioned.

The embodiment may perform one or more operations on the captioning data to evaluate and/or score the corresponding captions and, by extent, the captioner.

For example, the embodiment may determine an overall number of grammatical and/or spelling errors, as well as a number of grammar and/or spelling errors within a given time frame or number of words. The embodiment may segment the captioning data into text blocks containing either set numbers of words or all words captioned within a particular time. For example, the embodiment may segment captioning data into 100-word blocks or into 15-second blocks. Blocks may also include the date and time, down to seconds, at which each block starts and ends. The various operations discussed herein may be performed either on each block or on the captioning data as a whole.

In addition to determining grammatical and/or spelling errors in captions, the embodiment may compute a words-per-minute ("WPM") score for captioning data. The embodiment may likewise determine a captioning cadence or rhythm. Cadence may be determined by evaluating the number of words in each time block and checking to see if any particular time block has either an inordinately high or inordinately low number of words. A relatively high number of words in one or more adjacent time blocks may indicate "bursting" of captions. Bursting generally refers to rapid captioning and may lead to captions appearing only momentarily on a display screen before scrolling off the screen. Similarly, a relatively low number of words in one or more adjacent time blocks may indicate a captioning lag, which may lead to dead captioning time (e.g., moments where no or very few captions appear, despite ongoing talk or voice). Further, lag may require bursting for a captioner to catch up to the audio of a program or medium being captioned, thus exacerbating captioning issues.

The embodiment may also ignore one or more time blocks having no words therein or a number of words below a threshold. This may be useful, for example, when determining any of the metrics above. Continuing the example, many times commercials or other program interruptions are not captioned. (As another example, a court reporter may be idle when no person is speaking in court.) Such deliberately idle or un-captioned blocks should not be used when determining a metric such as words-per-minute since it would skew the metric by including time when the captioner was not supposed to be captioning.

The various metrics described herein may be used by the embodiment or by a user to evaluate a captioner and/or provide feedback to a captioner. For example, the embodiment may create a report listing each metric and classifying a captioner's performance based on one or more metrics.

Exemplary Operating Environment and Embodiment

FIG. 1 displays an exemplary embodiment in an exemplary operating environment. Generally, the embodiment may operate across a network 100, as shown in FIG. 1. Exemplary networks 100 include the Internet, Ethernet, local-area networks, wide-area networks, wired networks, wireless networks (including infrared, radio frequency and Bluetooth networks), and so forth. Additionally, although the network is shown separating only the captioning encoder 120 from the server 130 and server 130 from the reporting tool 135, it should be understood that communications from the reporting tool 135 may travel over the network to an end user (perhaps at a terminal or computing device receiving the scoring report 140) and/or from the captioning device 110 to the captioning encoder 120. Additionally, the network 100 may be, in practical application, composed of multiple networks, each of which may be of any type previously mentioned.

The operation of the exemplary embodiment will now be described with respect to FIG. 1. Initially, a captioner may employ a captioning device 110 to generate caption content 115. The caption content 115 may be, for example, a stream or set of captions to accompany a television broadcast or other audiovisual event, a live event, a conference (whether in person or via telephone or other electronic device), a record of a conversation or proceeding (such as might be generated by a court reporter or a stenographer), a record of a written document, and so on. The term "event," as used herein, is intended to cover all of these examples as well as any other proceeding, display, or activity that may be captioned or transcribed. Likewise, where the event is recorded by a stenographer, court reporter or the like, the notes, record or stream of information is considered to be a "caption" as used herein.

The caption content 115 is transmitted from the captioning device 110 to a captioning encoder 120. The caption content 115 may be transmitted across the network 100 (or another network) or placed on a computer-readable medium accessed by the captioning encoder. The caption content 115 may be added to, or multiplexed with, a media stream (such as video intended for broadcast) by the captioning encoder and transmitted to one or more viewers. In addition, the captioning encoder 120 may create a data file 125 containing the captions created by the captioner, along with other information such as time stamps. Each line of captioning may be individually time stamped in one embodiment. In another embodiment, the captioning encoder 120 may create a series of time blocks, each of a fixed length, and containing or associated with captions occurring within each such time block. As an example, presume a captioned television program is thirty minutes long and each time block is fifteen seconds long. The show would include 120 separate time blocks and each time blocks may be associated with all captions occurring during the time block. Thus, the first time block may include or be associated with all captions occurring in the first fifteen seconds of the show. Likewise, the 50$^{th}$ time block would include or be associated with all captions occurring between twelve minutes and thirty seconds and twelve minutes and forty-five seconds from the beginning of the show. In alternative embodiments, the blocks may be of variable length. As one non-limiting example, each block may contain a specific number of words, sentences, captions and so forth.

In one embodiment, the data file 125 may be outputted by the captioning encoder in extensible markup language (XML) format. However, alterative embodiments of the invention may output a data file 125 in any of a number of computer-readable formats, including hypertext markup language format, rich text format, a word processor-compatible format and so forth. Accordingly, the format of the data file 125 discussed herein is intended to be exemplary rather than limiting. Embodiments of the invention may be configured to operate with (or create) data files 125 in any computer-readable format or any format desired.

The data file 125 may include one or more special indicators representing a change in speaker or a change of subject. For example, in one exemplary data file 125, a double caret (>>) may indicate the speaker of the present caption differs from the speaker of the prior caption. Similarly, a triple caret (>>>) may indicate the corresponding caption is concerned with a different topic or subject than the prior caption. The caret convention set forth in this paragraph is exemplary only; alternative embodiments may use different indicators for changes in speaker or subject or may omit such indicators entirely. As another example, the color of text or other data in the file may change to represent such changes, or metadata may be appended to each caption and indicate subject/speaker changes.

The data file 125 may be transmitted by the captioning encoder 120 across a network 100 and to a remote server 130. "Remote" here refers only to the fact that the server is not co-located with the captioning encoder 120 but instead separated by the network 100. In alternative embodiments, the server 130 and captioning encoder 120 may be co-located or the server 130 omitted entirely.

The server 130 may be accessed by a reporting tool 135 in order to supply the data file 125 to the reporting tool. Alternatively, the server 130 may transmit the data file 125 to the reporting tool 135 so that the tool may locally store a copy of the data file. In yet another alternative embodiment, the reporting tool 135 may operate on, or be a part of, either the server 130 or captioning encoder 120. In still another embodiment, the server 130 may be omitted and the data file 125 transmitted from the encoder 120 directly to the reporting tool 135.

The reporting tool 135 generally permits a user to review the data file 125 and/or generate an scoring report 140. The scoring report 140 alternatively may be automatically created by the reporting tool 135 without user input or interaction. In one embodiment, the reporting tool displays the captions contained in the data file, along with the blocks and any associated time stamps (such as the beginning and/or ending times/dates for each block). A user may then compare the words in each caption of the data file 125 against a transcript of the broadcast or media being captioned ("broadcast," as used herein, refers to a terrestrial or satellite broadcast, as well as any media transmitted in any form or any captioned media. Thus, "broadcast" is intended to cover, for example, media streaming or sent across a network, a captioned television program or movie, a captioned audio or video computer-accessible file, and so forth.) The user may flag misspelled words in the data file through the reporting tool 135. Likewise, the user may flag or mark grammatical errors in the data file trough the reporting tool. Generally, grammatical and/or spelling errors are determined by reference to the aforementioned transcript, reference to captioning instructions or by playing back the file containing that was captioned. Thus, for example, the user may simply listen to an audio portion of a broadcast in order compare it to the captions in the data file and thus determine captioning errors. In an alternative embodiment, the reporting tool 135 may employ speech or audio recognition to determine captioning errors in the data file. In yet other embodiments having a transcript available, the transcript may be compared to the data file and captioning errors flagged if the transcript is in a computer-readable format. As still another option, the reporting tool 135 may have text recognition capabilities, such as optical character recognition, facilitating the tool's scanning of a text transcript, recognition of the transcript's contents, and comparison of those contents against the captions in the data file 125 to flag spelling and/or grammar errors. ("Grammar errors," as used herein, include punctuation errors.)

In embodiments where the reporting tool 135 automatically determines spelling and/or grammar errors in the captions of the data file 125, the reporting tool may be configured to ignore the time stamps in the data file as well as any characters representing speaker identification or subject changes.

In certain embodiments, the reporting tool 135 may employ the special characters for speaker and/or subject changes instead of ignoring them. For example, the reporting tool 135 may compare the special characters to those in a transcript to determine if subject changes and/or speaker changes are accurately captioned. If not, the presence of extraneous change characters may be reported/flagged or the absence of the same likewise reported.

The reporting tool 135 may generate a report or other output showing the number of errors made by the captioner, a total number of minutes captioned, a total number of minutes not captioned (including, for example, commercials), average words per minute of captioning, a distribution of words per minute, and an overall score for each captioner. Such reports are discussed in more detail with respect to FIG. 3, below.

It may be useful to discuss a general format for an exemplary data file 125 in one embodiment of the invention. The data file 125 may include a number of blocks 200, segmented in this embodiment by time. Each block 200 represents 15 seconds of time. Thus, where the data file 125 contains captions broadcast with a television program or synced to/displayed with a single media or multimedia presentation (such as a slide show, movie, television broadcast, musical presentation, MPEG playback, and so forth), each block represents the captions that were displayed during a corresponding 15 seconds of the presentation. The data file may also contain a time and date at which the caption content 115 started, or generation of the content started, as well as an identifier corresponding to either the event that was captioned or the caption content 115 itself.

As mentioned above, the data file may be formatted in XML format in one exemplary embodiment of the invention. In alternative embodiments, a different computer-readable format may be used. For example, the data file 125 may be formatted in a word processor format or HTML format.

Operation of the Reporting Tool

Figure 2:
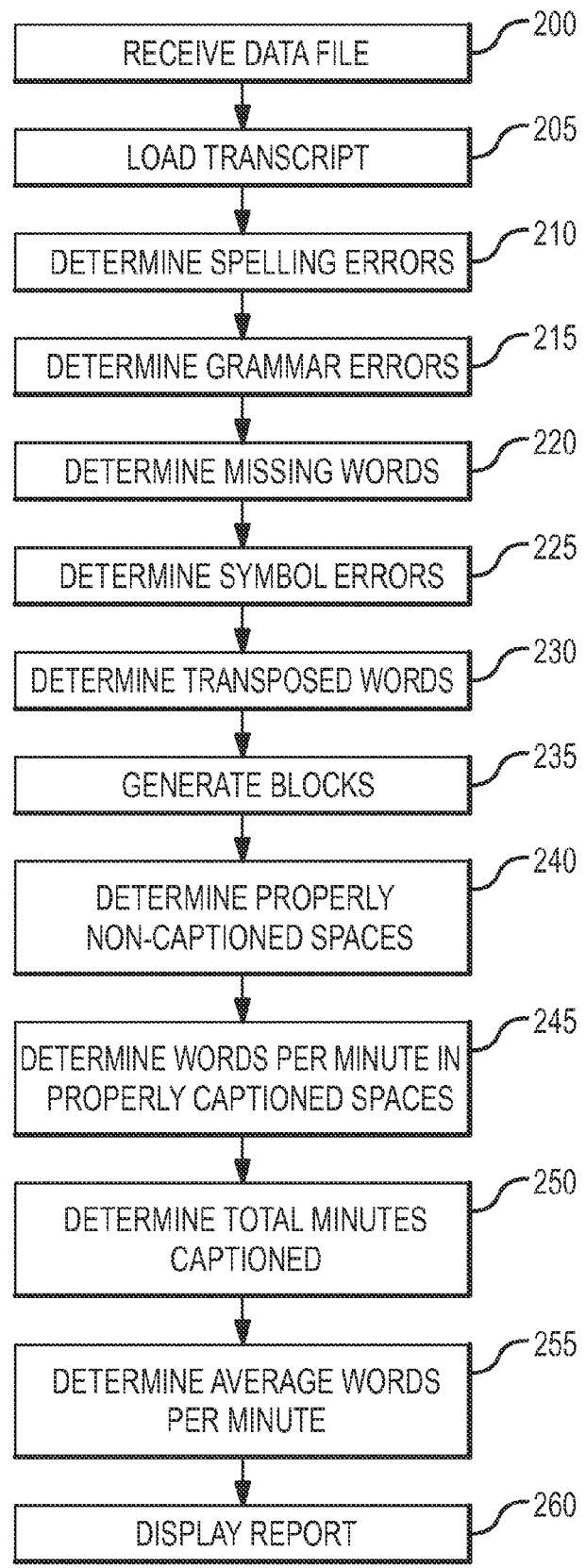
FIG. 2 is a flowchart showing the operations undertaken by a reporting tool in the context of the exemplary embodiment of FIG. 1.

FIG. 2 is a flowchart showing the operations undertaken by the reporting tool 135 in the exemplary embodiment. First, in operation 200 the reporting tool 135 receives the data file 125. Typically, the data file is received from the server 130, but may alternatively be received directly from the captioning encoder 120. As yet another alternative, the data file may be locally stored in or with the embodiment. In operation 205, a transcript of the event may be accessed ("loaded") by the reporting tool. The transcript, as explained above, may contain audio, text or a mixture of the two. Further, as discussed in more detail below, operation 205 is entirely optional and may be omitted in certain embodiments.

In operation 210, the embodiment may determine spelling errors in the captions of the data file 125 by comparing the captions to the transcript or by employing a spell-checker.

In operation 215, the embodiment determines grammar errors in the captions by comparing the captions to either the transcript accessed in operation 205 or to a standard set of grammar rules, such as those sometimes used by word processing applications. Certain embodiments may compare the captions to both.

In operation 220, the embodiment scans the captions in the data file 125 to determine if any words were inadvertently omitted. Again, the embodiment may compare the captions to the transcript or the grammar rule set to determine if words are (or likely are) missing.

In operation 225, the embodiment determines if any symbols, such as dollar signs, are missing from the captions through reference to a rule set for symbol use or the transcript.

In operation 230, the embodiment may compare the captions in the data file 125 to the transcript accessed in operation 205 to determine if two words are transposed. Again, alternative methods of determining grammar, spelling or transposition errors disclosed herein may be used instead of comparison to a transcript.

In operation 235, the reporting tool 135 may segment the captions in the data file 125 into blocks if this has not been previously done by the captioning encoder 120, captioning device 110, server 130 or another device. The blocks may each represent or correspond to a specific length of time or a number of words. In the present embodiment, each block represents 15 seconds of the event being captioned. The blocks may be shown on the scoring report 140 outputted by the reporting tool 135 (see, for example, FIG. 3B). Generally speaking, in embodiments where each block represents a time interval of the event, the blocks may be used in operations 240 to 255.

In operation 240, the reporting tool 135 determines which blocks deliberately lack captions, e.g., are deliberately not captioned by the captioner. For example, if the event is a television program, the captioner may not caption commercials. Since the caption content 115 and, by extension, the data file 125 contain all captions from the beginning of the event to the end of the event as well as time information across the event, there will be certain times in the data file and/or caption content corresponding to commercials. Insofar as no captions are generated for commercials, the blocks corresponding to commercials will contain no captions. Thus, these blocks would contain no captions by design and are thus "properly non-captioned" blocks or spaces. Likewise, if the event is a movie, certain stretches where no character speaks or no sound effect is present likewise may not be captioned. These stretches are again properly non-captioned spaces and the reporting tool 135 may so designate the corresponding blocks. In one embodiment, a block having less than a specific number of words therein is considered to be properly non-captioned. For example, if a block contains less than ten words, it may be designated as a properly non-captioned block. An alternative embodiment may designate any block having less than eight (or any other number) of words as a properly non-captioned block.

Once the properly non-captioned blocks or spaces are determined, the remaining blocks/spaces may be considered by the reporting tool to be those in which captions should be present. In operation 245, the embodiment determines an average words-per minute captioned in the properly-captioned blocks by totaling the number of words in each properly-captioned block and dividing by the number of minutes equating to all properly-captioned blocks. The number of minutes equating to all properly-captioned blocks may be calculated in the exemplary embodiment by summing the number of properly-captioned blocks and dividing by four. Since each block represents 15 seconds, 4 blocks represent one minute in the exemplary embodiment. In alternative embodiments having blocks of different time lengths, the number of minutes may be similarly computed although the divisor will change to reflect the length of each block. For example, if each block is one minute long, the number of blocks would be divided by one. Likewise, if each block is 30 seconds long, the number of properly-captioned blocks would be divided by two.

In operation 250, the reporting tool 135 may determine the total number of minutes properly captioned by subtracting the properly non-captioned time (calculated in operation 240) from the total event length. The total event length is generally included as an entry in the data file 125. It should be noted that operations 245 and 250 may be freely reversed in order.

In operation 255, the embodiment determines an average captioning rate, expressed in words per minute, for the event. The average captioning rate may be determined by totaling the number of captioned words, optionally ignoring words not meeting a minimum length, and dividing this total by the number of total minutes captioned. Alternatively, the reporting tool 135 may determine the average captioning rate by determining a number of words captioned in each block and multiplying this number by four for each block, thus yielding an average words per minute captioning speed at a per-block level. The average words per minute per block may then be averaged across all blocks to determine an average captioning rate for the event.

In operation 260, the reporting tool 135 may generate and display a scoring report 140. The scoring report, shown generally in FIG. 3A, may include a breakdown of the number of errors detected in operations 210-230, here labeled as an "accuracy readability rating" section ("ARR section") 300. The scoring report may likewise show the average words per minute captioned across the properly-captioned blocks of an event, a distribution of the number of words per minute captioned in each block, and summary data for the captioning rate of an event. This information is included in a "cadence summary" 310, which generally shows the rhythm or cadence of the captions. The cadence of the captions may convey information regarding a viewer's subjective experience. The ARR section 300, cadence summary 310 and scoring report 140 are discussed in more detail in Section IV., below.

In embodiments omitting operation 205, operations 210 to 230 may be performed without reference to a transcript and instead with reference to a dictionary and rules of grammar accessible to a computing device operating as the reporting tool 135 (or on which the reporting tool runs). As yet another alternative, the reporting tool 135 may display a report or file corresponding to the data file 125 to a user and the user may perform operations 205-230 by marking in the corresponding report the errors of the types discussed.

Additionally, it should be noted that one or more of operations 210 to 255 may be omitted in alternative embodiments of the invention. Similarly, the order in which the operations displayed in FIG. 2 are executed may be varied in alternative embodiments.

Scoring a Report

FIG. 3A shows a portion of a scoring report 140, including an accuracy readability rating 300 and cadence summary 310 for a captioned event. The ARR section 300 depicts the number of errors determined by the reporting tool 135 in operations 210-230 of FIG. 2, broken down by category. For example, in the exemplary scoring report 140 of FIG. 3A, the caption data of the data file 125 included 19 misspelled words or incorrect words, one transposed word, one punctuation error, and two word spacing errors.

The ARR section 300 may also include a score indicating the readability of the captions. This score 315, is calculated by determining a total number of accuracy errors 320 ("TARE"), subtracting the TARE from a total number of words captioned 325, and dividing by the total number of words captioned to yield a percentage of the caption content 115 that is correct and accurate.

In order to compute the TARE, the number of errors may be weighted and summed. Generally, errors except for punctuation, word spacing and inaudible errors due to errors in the audio feed to the captioner count as a single point. Punctuation errors count as half a point, and word spacing and inaudible errors accrue no points. The points are summed to yield the TARE. It should be noted that alternative embodiments may vary this scoring formula.

In addition to the accuracy readability rating section 300, the scoring report 140 may include a cadence summary 310. The cadence summary includes a distribution list, a number of blocks (or "intervals" in FIG. 3A) in each distribution, and a percentage of total intervals in each distribution. The average words per minute for each block may be determined by the reporting tool 135; this average may then be used to assign the block to one of the distributions. It should be noted that the total number of blocks/intervals shown in the cadence summary 310 of FIG. 3A is the number of properly-captioned blocks determined in operations 240 and 245 of FIG. 2.

Generally, a steady cadence is reflected by a relatively tight grouping of blocks in a relatively small number of adjacent distributions. The tighter this grouping, the more consistent the flow of captions in a broadcast or other replay of an event and the better the experience for a reader of the captions. Excessively fast, slow, or irregular captioning may cause the reader to miss captions and lose the flow of the event.

The cadence summary 310 also shows the total minutes of an event, the total minutes of properly non-captioned blocks (here shown as "total minutes of commercials"), total minutes of properly-captioned blocks (here shown as "total minutes of captioning") and average words per minute for all properly-captioned blocks. In addition, the cadence summary 310 may include a summary of words per minute within the various blocks, such as a high, low and average number of words per minute for the blocks.

Further, the scoring report 140 may include event information 305, such as the aforementioned event identifier and event date, including time.

Figure 3B:
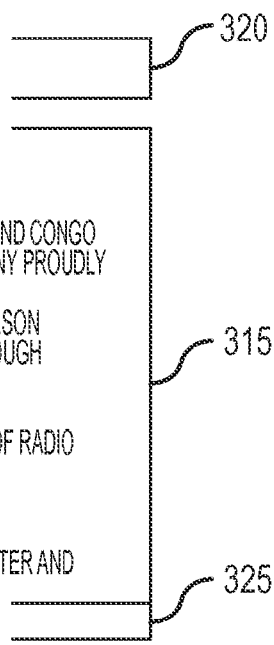
FIG. 3B shows a second portion of a sample scoring report generated by a reporting tool.

FIG. 3B depicts a portion of the scoring report 140 displaying caption data broken into 15-second blocks 315. Each block 315 may be broken into sub-blocks 320. In the example of FIG. 3B, each block is 15 seconds and each sub-block 320 is one second. Further, the average words per minute 325 for each block may be calculated and included in the scoring report 140 at the end of each block.

FIG. 4 is a second, alternative scoring report generated by a reporting tool 135 in an alternative embodiment of the present invention. In this embodiment, no cadence summary 310 is generated. Instead, the scoring report includes only the ARR section 300 and a listing of the captions broken into blocks 315 and sub-blocks 320, as well as the average words per minute per block 325.

In such an embodiment, a second reporting tool may generate the cadence summary 310 and append it to the scoring report 140. That is, the reporting tool 135 may be separated into a number of software or hardware modules, each responsible for a different section of the scoring report 140. Alternatively, the reporting tool 135 may generate only the ARR summary 300 or cadence summary 310 and omit the other portion.

The ARR section 300 and/or cadence summary 310 may be used to rank captioners according to the cadence and/or accuracy of their generated captions. For example, captioners consistent in their rates of captioning (as expressed in words per minute captioned) may be ranked higher than those having highly variable captioning rates. Likewise, more accurate captioners (as expressed by their ARR 315) may be ranked more highly than less accurate captioners. Consistency in captioning may be determined in one embodiment by determining a percentage of blocks falling within a mean distribution of words per minute. Continuing the example, the embodiment may determine the distribution for each block in terms of words per minute as shown in the cadence summary 310 of FIG. 3A. The embodiment may take the distribution having the highest number of blocks (shown in the cadence summary as "number of intervals") and a certain number of distributions above and below the distribution having the highest number of blocks, yielding a common distribution band. The number of blocks in these distributions may be summed and divided by the total number of properly-captioned blocks, which is shown as the "total intervals" in the cadence summary 310 of FIG. 3A. The result is the percentage of blocks falling within the common distribution band. The higher the percentage, the more blocks within the common distribution band and thus the more regular the captioning cadence or speed. As an example, if the reporting tool 135 employs five distributions in the example of FIG. 3A, the lowest distribution would be 121-130 words per minute and the highest would be 171-180 words per minute with the highest distribution being 150-160 words per minute, in which 23 blocks fall. A total of 48 blocks fall in these five distributions (7+9+23+4+5) and the event included 79 blocks. Thus, 48/79 or 60.7% of the blocks fall within five distributions. This reflects a relatively steady cadence.

Captioners producing captions having a relatively regular cadence may be ranked more highly than those producing an irregular cadence. In some embodiments, this cadence determination may be coupled with a minimum acceptable captioning rate (again expressed in words per minute) such that cadence is ignored unless the average cadence or captioning rate exceeds the minimum acceptable captioning rate. Further, the band of each distribution may vary in alternative embodiments, such that each distribution may vary from the next by more or less than ten words per minute.

FIG. 4 also depicts the scoring rules 400 used by the sample embodiment to produce an evaluation and/or score with respect to the transcript and/or data file 125. The scoring rules are intended as examples only. Alternative embodiments may employ different rules, keep one or more of the sample rules shown, or employ a mixture of new and sample rules.

Conclusion

Although the present invention has been described with respect to various embodiments, systems and processes herein, it will be appreciated by one of ordinary skill in the art that the embodiments, systems and/or processes may be changed without departing from the spirit or scope of the invention. For example, the reporting tool 135 may be segmented into multiple modules, each of which performs a separate function. Continuing the example, one module of the reporting tool 135 may determine errors and the ARR 315, while a second module may determine the words per minute data and cadence summary 310. Each such module may operate or run on a separate computing device and data may be passed from one module to another. Data may be passed, for example, across the network 100. As yet another example, the reporting tool 135 may be integrated into the server 130 or captioning encoder 120.

Additionally, it should be noted that certain embodiments of the present invention may be configured to ignore captions summarizing portions of an event or event audio. It is often necessary to summarize in captions due to the speech speed of persons being captioned. In such embodiments, the transcript may be edited prior to use by the reporting tool 135 in order to reflect acceptable summaries or flag areas where summaries are acceptable, a user may manually override or employ the reporting tool 135 to eliminate errors arising from such summaries, the reporting tool 135 may be provided with sufficient intelligence to recognize summaries and ignore word differences therein, or the summaries may be transparent to the reporting tool insofar as the reporting tool does not access a transcript.

It should also be noted that various embodiments of the invention may change the format or data included in a scoring report, adding to or omitting from the information described herein as necessary or desired. As a simple example, some scoring reports may omit a transcript of the captioned data Accordingly, the proper scope of the invention is determined by reference to the appended claims.

We claim:

1. A system for determining an accuracy of a caption data set, comprising:
   at least one computing device; and
   a captioning evaluation tool, executing on the at least one computing device, that determines the accuracy of a caption data set by:
   receiving the caption data set;
   determining a number of errors in the caption data set; and
   determining the accuracy of the caption data set using at least the number of errors in the caption data set.

2. The system of claim 1, wherein the captioning evaluation tool further:
   segments the caption data set into a number of intervals;
   determines a number of words per minute for each of the intervals; and
   determines a cadence for the caption data set using the number of words per minute for each of the intervals.

3. The system of claim 2, wherein the captioning evaluation tool further:
   generates a report displaying at least the accuracy and cadence for the caption data set.

4. The system of claim 2, wherein the caption data set comprises closed captions for an audiovisual event.

5. The system of claim 2, wherein the caption data set comprises a transcription of a live event.

6. The system of claim 2, wherein the captioning evaluation tool segments the caption data set into a number of intervals by:
   determining a length of time; and
   breaking the caption data set into a series of intervals based on the length of time.

7. The system of claim 6, wherein the captioning evaluation tool determines the accuracy of the caption data set using the number of errors in the caption data operation of using the number of errors by:
- counting a first number of errors within at least a first interval;
- counting a second number of errors within at least a second interval;
- counting a first number of words within the at least first interval;
- counting a second number of words within the at least second interval;
- adding the first number of errors and second number of errors to produce a total error;
- adding the first number of words and second number of words to produce a total word count; and
- dividing the total error by the total word count to yield the accuracy.

8. The system of claim 6, wherein the captioning evaluation tool determines a cadence for the caption data set using the number of words per minute for each of the intervals by:
- calculating a plurality of distributions;
- assigning each of a plurality of intervals to one of the plurality of distributions based on a characteristic of each of the plurality of intervals;
- determining a number of intervals in each of the plurality of distributions; and
- reporting a grouping of the plurality of intervals within a subset of the plurality of distributions.

9. The system of claim 8, wherein each of the plurality of intervals is assigned to one of the plurality of distributions based on a number of words present in the interval.

10. The system of claim 9, wherein each of the plurality of intervals corresponds to a range of word counts.

11. A method for electronically determining an accuracy of a caption data set, comprising:
- receiving a caption data set utilizing at least one processing unit;
- evaluating the caption data set, utilizing the at least one processing unit, to determine at least one of a number of errors in the caption data set or a cadence of the caption data set; and
- determining an accuracy of the caption data set, utilizing the at least one processing unit based at least on at least one of the number of errors and the cadence.

12. The method of claim 11, further comprising evaluating the caption data set to determine a number of spelling errors in the caption data set by at least one of:
- evaluating the caption data set utilizing a spell-checker;
- comparing the caption data set to a transcript of an event associated with the caption data set; or
- receiving user input indicating spelling errors in the caption data set.

13. The method of claim 11, further comprising evaluating the caption data set to determine a number of grammar errors in the caption data set by at least one of:
- comparing the caption data set to a standard set of grammar rules;
- comparing the caption data set to a transcript of an event associated with the caption data set; or
- receiving user input indicating grammar errors in the caption data set.

14. The method of claim 11, further comprising evaluating the caption data set to determine a number of omitted words in the caption data set by at least one of:
- comparing the caption data set to a standard set of grammar rules;
- comparing the caption data set to a transcript of an event associated with the caption data set; or
- receiving user input indicating omitted words in the caption data set.

15. The method of claim 11, further comprising evaluating the caption data set to determine at least one of a number of omitted captioning symbols and a number of incorrect captioning symbols by at least one of:
- comparing the caption data set to a rule set for symbol use;
- comparing the caption data set to a transcript of an event associated with the caption data set; or
- receiving user input indicating at least one of omitted captioning symbols and incorrect captioning symbols in the caption data set.

16. The method of claim 11, further comprising evaluating the caption data set to determine a number of transposed words in the caption data set by at least one of:
- comparing the caption data set to a standard set of grammar rules;
- comparing the caption data set to a transcript of an event associated with the caption data set; or
- receiving user input indicating transposed words in the caption data set.

17. The method of claim 11, wherein said operation of determining the accuracy of the caption data set further comprises dividing a total number of errors in the caption data set by at least one of a total number of words in the caption data set and a total number of units of time.

18. The method of claim 11, further comprising:
- assigning a first weight to a first kind of error;
- assigning a second weight to a second kind of error; and
- computing a total number of errors in the caption data set by adding a product of the first weight times a number of the first kind of error in the caption data set to a product of the second weight times a number of the second kind of error in the caption data set.

19. The method of claim 11, wherein said operation of determining the accuracy of the caption data set further comprises determining whether the cadence indicates at least one of bursting of captions and caption lag.

20. The method of claim 11, further comprising transmitting the accuracy of the caption data set to a user as part of a scoring report.

* * * * *